United States Patent [19]

Thompson et al.

[11] 4,036,335
[45] July 19, 1977

[54] ADJUSTABLE SHOCK ABSORBER

[75] Inventors: John T. Thompson, West Los Angeles; Arnold A. Cowan, Encino, both of Calif.

[73] Assignee: Arnold A. Cowan, Encino, Calif.

[21] Appl. No.: 602,996

[22] Filed: Aug. 8, 1975

Related U.S. Application Data

[60] Continuation of Ser. No. 457,059, April 1, 1974, abandoned, which is a division of Ser. No. 379,612, July 16, 1973, Pat. No. 3,848,710, which is a continuation of Ser. No. 179,752, Sept. 13, 1971, abandoned.

[51] Int. Cl.² .............................................. F16F 9/44
[52] U.S. Cl. ..................................... 188/319; 74/107; 267/34
[58] Field of Search ............... 188/282, 299, 319, 278; 267/8, 34; 74/107

[56] References Cited

U.S. PATENT DOCUMENTS

| 1,135,923 | 4/1915 | Reynolds | 188/319 |
| 2,586,478 | 2/1952 | Paxhia | 74/107 |
| 2,745,517 | 5/1956 | Zook | 188/319 |
| 3,275,277 | 9/1966 | Illar et al. | 188/299 X |
| 3,603,575 | 9/1971 | Arlasky et al. | 267/34 |

FOREIGN PATENT DOCUMENTS

| 652,901 | 11/1962 | Canada | 188/319 |
| 1,043,175 | 6/1953 | France | 188/319 |
| 565,630 | 11/1944 | United Kingdom | 188/319 |
| 763,557 | 12/1956 | United Kingdom | 188/317 |

Primary Examiner—George E. A. Halvosa
Attorney, Agent, or Firm—Mahoney, Schick & Cislo

[57] ABSTRACT

A shock absorber, in an exemplary embodiment, especially suited for motorcycles and the like characterized as being fabricated of a minimum number of components assembled in a manner which permits rebuilding of worn components and wherein selected variable dampening is obtained through the provision of external adjustment device for varying the degree of dampening. The adjustability features allow for variable jounce and rebound factors to accommodate both normal and severe driving conditions and to permit compensation thereof, all without dismantling or demounting of the shock absorber from the vehicle with which it is associated. Adjustment in one instance comprises metering the hydraulic fluid and in the other instance varying the disposition of the main compression spring. Structure on the body of the shock absorber is provided to dissipate heat thereby increasing the quality of performance of the shock absorber during jounce and rebound conditions. Also disclosed is a piston having novel orifice and valve arrangement through which hydraulic fluid flows. In other embodiments a compensator device within the cylinder of the shock absorber prevents aeration and hence breakdown of the hydraulic fluid. Other unique features are also disclosed.

9 Claims, 11 Drawing Figures

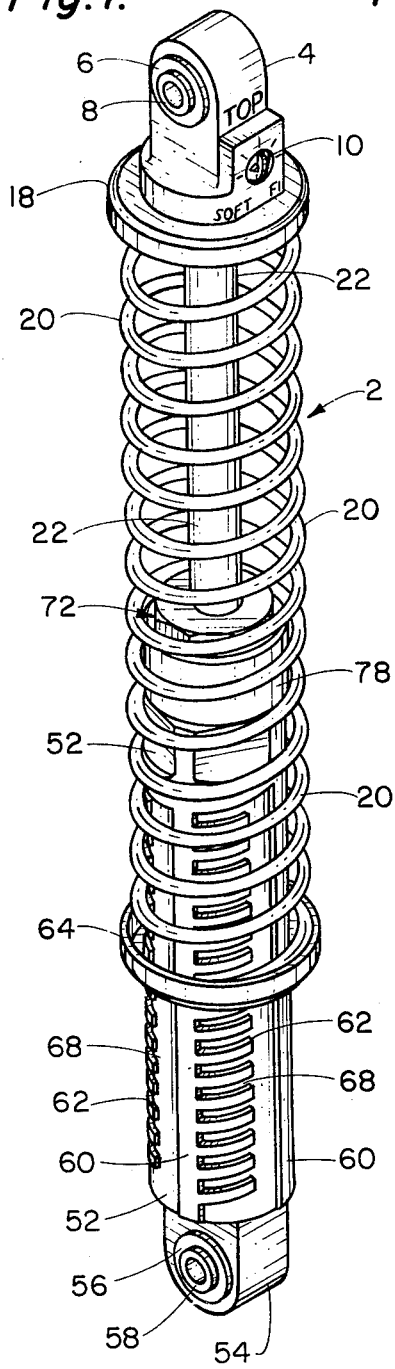
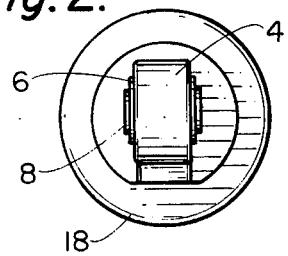
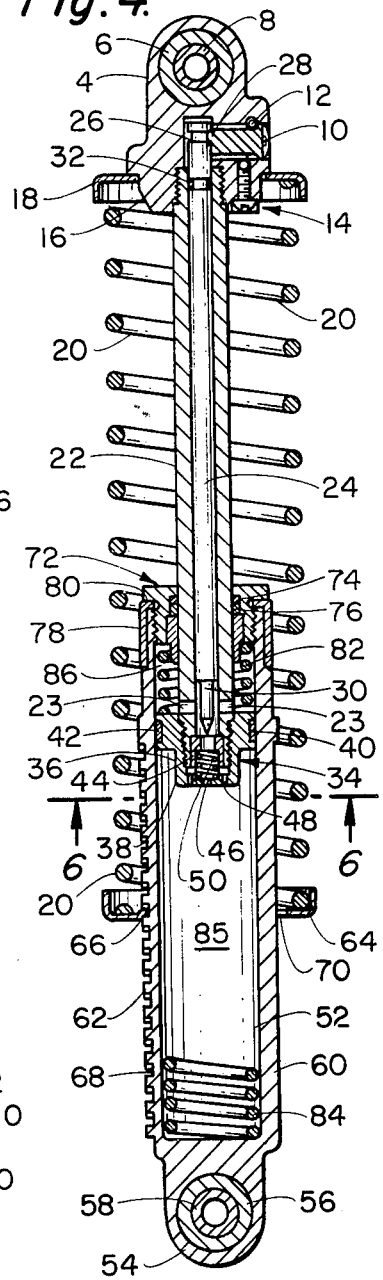
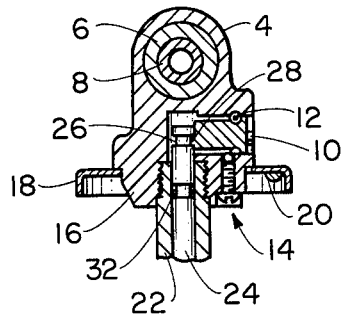
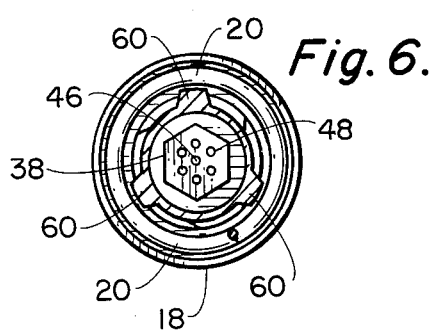

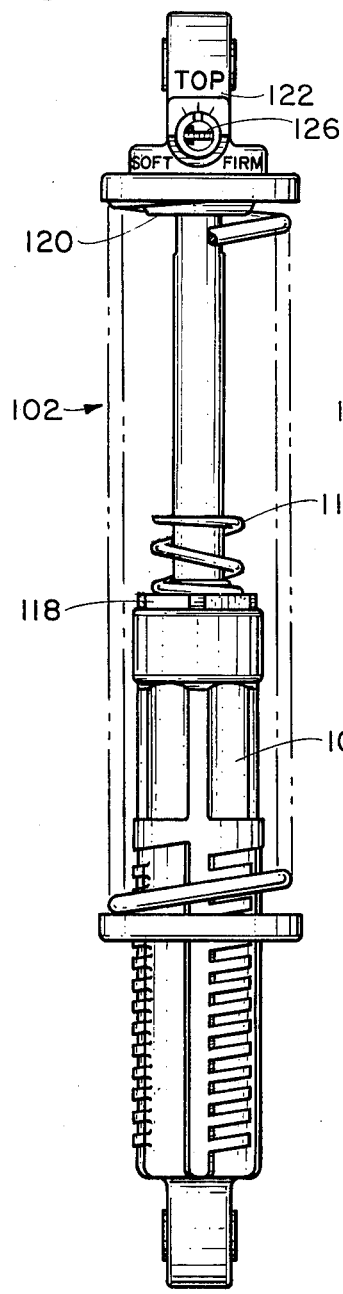
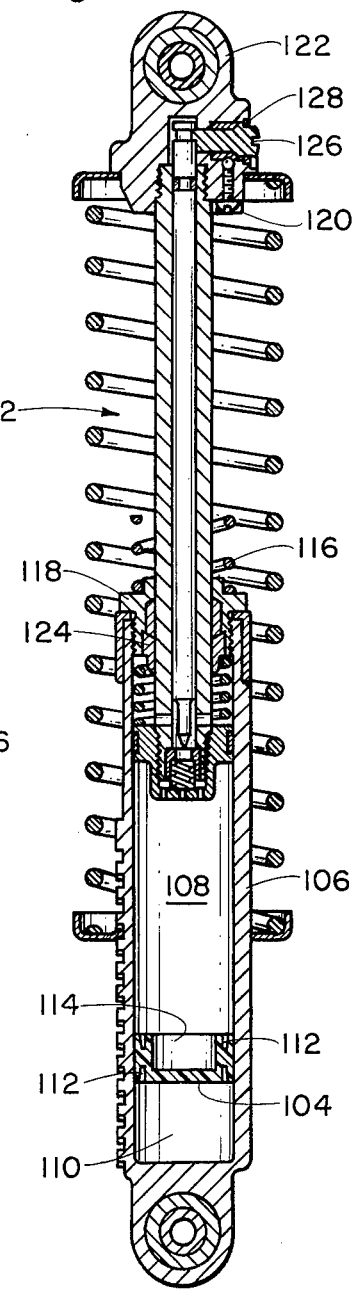
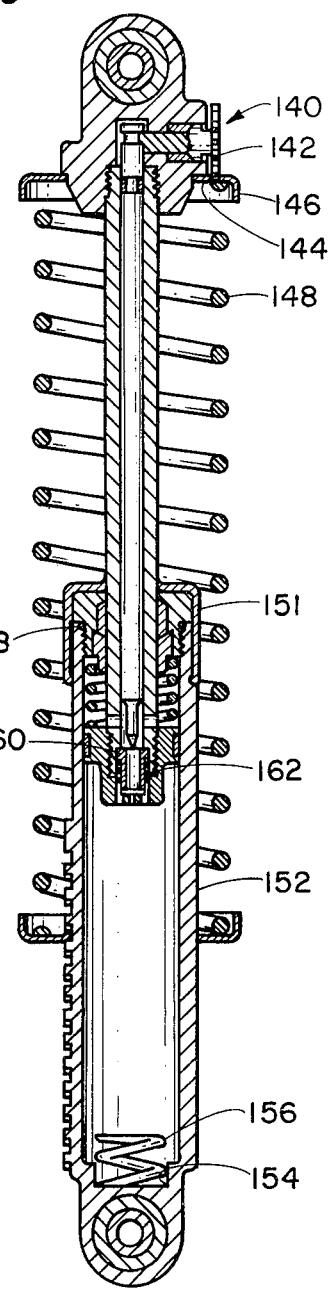
Fig. 8.  Fig. 9.  Fig. 11.
Fig. 10.

ADJUSTABLE SHOCK ABSORBER

REFERENCE TO RELATED APPLICATIONS

This is a continuation of application Ser. No. 457,059, filed Apr. 1, 1974, now abandoned, Application Ser. No. 457,059 is a divisional application of co-pending application Ser. No. 379,612, filed July 16, 1973, now U.S. Pat. No. 3,848,710, which in turn is a continuation application of application Ser. No. 179,752, filed Sept. 13, 1971. now abandoned

BACKGROUND OF THE INVENTION

The shock absorber of the invention is directed toward use with motor vehicles of various types. More specifically, the shock absorber of this invention is especially adaped for use with motor vehicles such as the motorcycle, motor bite, dune buggy or similar vehicle having a dichotomy of end uses, both normal or usual are wholly recreational. In vehicles of the aforementioned type, there is a need to be able to drive said vehicles on improved and paved roads with ease and comfort and still be able to take the same vehicle over rough terrain over which recreational activities are engaged, while still having the attributes of a shock absorber system.

For example, in recent years the general public has become very interested in recreational sport-type racing or rally-type driving over courses offering both unusual excitement and a test of one's driving skill. Courses for such sport driving are makeshift in that hill or desert topography is chosen by the rider. In such instances, where the driver leaves an improved road and goes onto abnormal driving surfaces, there exists a need to be able to quickly adjust the shock absorbing characteristics of the shock absorbers employed upon his vehicle. Additionally, the dampening action of the shock absorbers must be of a type that will provide the best performance under the circumstances with which the vehicle is used to improve traction, cornering and overall rideablility.

Moreover, there is a need for a shock absorber for all types of motor vehicles that is fabricated; of simple and rugged design and which lends itself to rebuilding should one or more of the components wear out from use. Additionally a high performance shock absorber should be sophisticated in design to permit heat dissipation of heat build up in the shock absorber itself and means taken to prevent aeration of a hydraulic fluid used in the shock absorber the end result of which will be to exercise some measure of control over the dampening action and to increase the longevity of the dampening fluid, such as hydraulic fluid, by viscosity control and the prevention of the breakdown of the lubricity thereof.

The prior art shock absorbers are deficient in the aspect that they do not employ a metering valve for the dampening fluid which is directly responsive to the differential pressures existing within the pressure tube of the shock absorber. That is, during recovery or rebound conditions of the shock absorber, there will be a tendency, in the normal case, of a dampening fluid such as hydraulic oil to return to the main reservoir as rapidly as possible. In the shock absorber of this invention the return of the hydraulic oil is metered and dependent upon the relative pressures existing within the shock absorber itself. Furthermore, shock absorbers of the prior art lack in performance adustment of their absorption qualities. While some may provide for some means of hydraulic fluid metering, such adjustment normally requires the dismantling or removal of the shock absorber from the vehicle with which it is associated, while our shock absorber is externally adjustable.

Additionally, the prior art shock absorbers do not provide for adjustability of the main shock absorber spring relative to the ends thereof and do not employ topout and bottom-out springs for cooperation with the piston of the shock absorber. These as well as other features of the hereindisclosed shock absorber overcome the deficiencies existing in the prior art.

OBJECTS AND SUMMARY OF THE INVENTION

It is an object of the invention to provide a shock absorber for motor vehicles.

It is another object of the invention to provide a shock absorber for motor vehicles especially those that will encounter variant driving conditions.

It is still another object of the invention to provide a shock absorber of the adjustable type to meet a myriad of road conditions.

It is still another object of the invention to provide a shock absorber which has external adjustment means wherein the flow of dampening fluid may be controlled.

It is still another further object of the ivnention to provide a shock absorber wherein hydraulic fluid is metered through the piston of the shock absorber and the return of the fluid is dependent upon the relative differential pressures existing within said shock absorber.

It is still another and further object of the invention to provide a shock absorber assembly wherein a poppet value utilized in the piston assembly is responsive to the differential pressures within the pressure tube of the shock absorber.

It is still another and further object of the invention to provide a shock absorber having a longitudinally reciprocal metering means to restrict the flow of hydraulic fluid passing through the piston of the shock absorber.

It is still another and more important object of the invention to provide a shock absorber of the type which is externally adjustable to vary the flow of hydraulic fluid through the piston thereof to meet a variety of driving needs.

It is still another and more important object of the invention to provide a shock absorber which is simple and rugged in construction and which may be easily rebuilt.

It is another and further object of the invention to provide a shock absorber wherein the main external spring thereof is adjustable to vary the action accomplished by the shock absorber.

It is still another and more specific object of the invention to provide a shock absorber wherein the main external spring is annually adjustabe in one of a plurality of positions to impart to it a plurality of states of compression without the need of tools.

It is still another and further specific object of the invention to provide a shock absorber especially adapted for use with motorcycles and the like vehicles wherein the pressure tube of the device is so configured so as to allow for dissipation of heat buildup in the pressure tube.

It is still another and more specific important object of the invention to provide a shock absorber having a pressure tube with the wall thereof having a fin-like configuration for maximum surface exposure to the ambient atmosphere.

It is another and further important object of the invention to provide a shock absorber wherein a bottoming out spring is used in the construction thereof which in conjunction with an externally mounted main spring achieves a variable rate spring effect in the operation of the shock absorber.

It is still another and more specific important object of the invention to provide a shock absorber which is provided with means to absorb impact forces under high jounce conditions and to return the piston of the shock absorber assembly to its normal position.

It is still another and still further important object of the invention to provide a shock absorber utilizing a compensator means to prevent aeration of the hydraulic fluid used in the pressure tube thereof.

It is still another and more specific object of the invention to provide a shock absorber employing means which permit the adjustability of the dampening rate of the shock absorber.

In an exemplary embodiment, the invenion is directed to a hydraulic shock absorber comprising the combination of a pressure tube having a reciprocal piston assembly therein wherein the assembly has at least first and second fluid passageways from one side of said assembly to the other side and which are open to hydraulic fluid flow during normal and jounce conditions. A valve means controls the hydraulic fluid flow through said at least said first and second fluid passageways and is responsive to hydraulic fluid differential pressure to close said at least second fluid passageway during rebound conditions and to restrict the flow of hydraulic fluid in said pressure tube from said other side of said assembly to said one side.

In other embodiments of the invention, exemplary attributes include the adjustability of the hydraulic fluid flow through the piston assembly by means of a longitudinally shiftable rod which is adjustable externally of the shock absorber assembly without dismantling the same. Another embodiment employs a unique arrangment for mounting the main shock absorber spring so that various degrees of compression may be imparted thereto by the simple expedient of having one of the mounting members vertically movable into one of a selected plurality of positions. In other embodiments, the use of a bottoming and topping spring provides attributes for aiding in recovery of the shock absorber piston assembly at high levels of jounce and/or rebound impacts. In still another embodiment, the wall of the pressure tube is provided with a heat dissipation configuration such as, for example, ribs and may also be provided with a compensator means within the pressure tube to inhibit the mixing or contacting of the hydraulic fluid by air normally in the pressure tube of the shock absorber to thereby prevent deterioration and oxidation of the fluid.

These and further objects of the invention will become apparent from the hereinafter following commentary taken in conjunction with the drawings which are for purposes of illustration only.

BRIEF DESCRIPTION OF THE DRAWINGS:

FIG. 1 is a perspective view of one embodiment of the shock absorber of this invention;

FIG. 2 is a top view of the shock absorber illustrated in FIG. 1;

FIG. 3 is a bottom view of the shock absorber illustrated in FIG. 1;

FIG. 4 is an elevation view, partially in cross-section, taken along the line 4-4 of FIG. 3 showing the metering rod in full line and not showing the hydraulic fluid normally contained within the pressure tube of the assemblage, all for purposes of clarity, FIG. 5 is a more detailed view of the upper portion of the shock absorber illustrated in FIG. 4;

FIG. 6 is a view taken along the line 6-6 of FIG. 4;

FIG. 8 is an elevational view illustrating another embodiment of the shock absorber of this invention;

FIG. 9 is an elevational, cross-sectional view of the shock absorber illustrated in FIG. 8, again with the metering rod shown in full line and the hydraulic fluid not shown for purposes of clarity and;

FIG. 10 illustrates still another embodiment of the shock absorber of this invention, in particular the lower-most portion as might be employed in the FIG. 9 embodiment.

FIG. 11 illustrates still other alternative arrangments for the shock absorbers of this invention.

DESCRIPTION OF THE BEST EMBODIMENTS CONTEMPLATED

Figure 7:
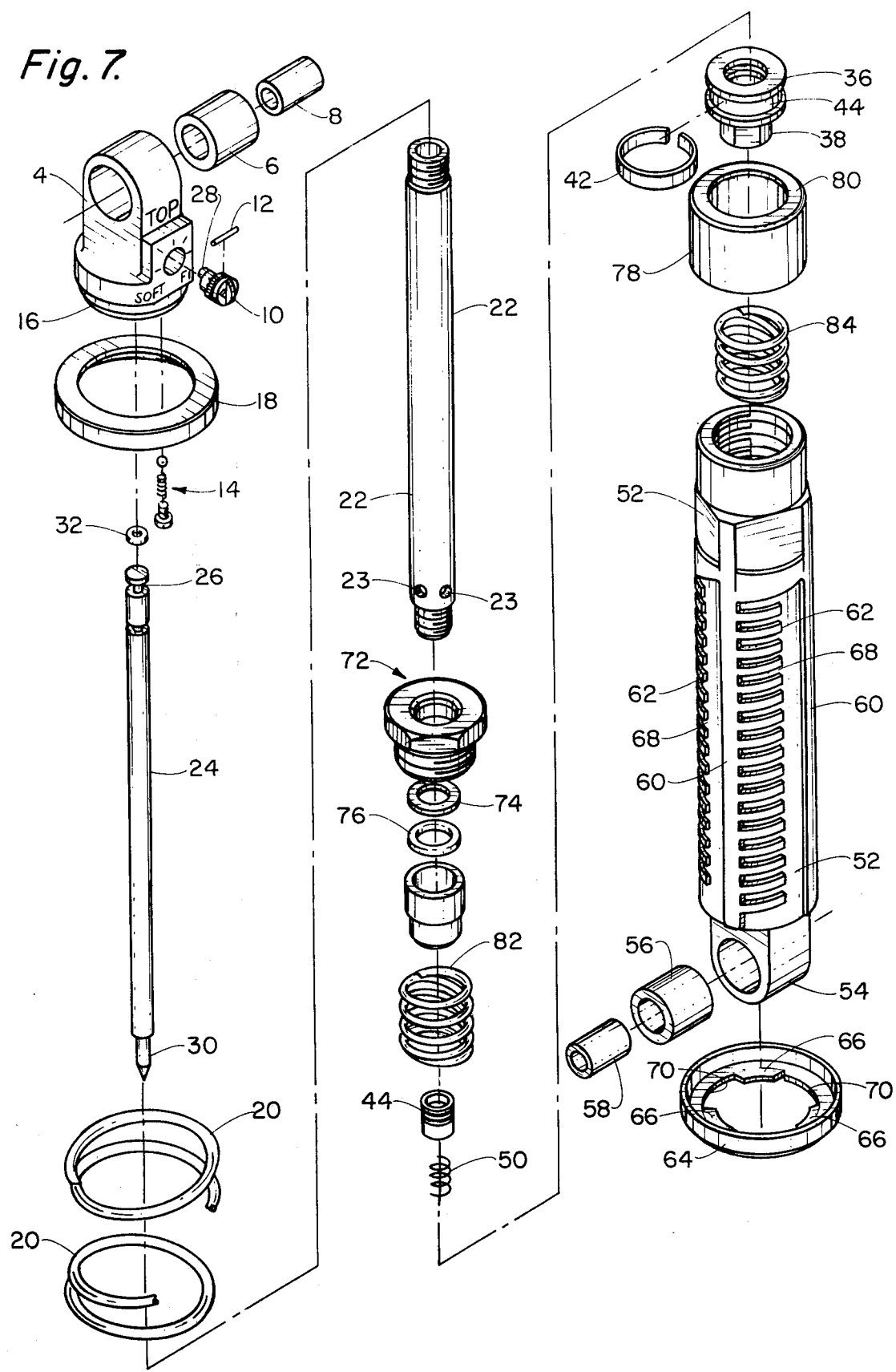
FIG. 7 is an exploded view showing the essential components of the shock absorber of this invention illustrated in FIG. 1.

The shock absorbers that will be disclosed will have specific application for use in conjunction with motorcycles and the like vehicles but the general configuration, design and specific features of the invention will have applicability, as those of ordinary skill in the art will recognize, in shock absorbers for other vehicles such as motor cars and the like.

Referring now to the figures of drawings wherein like numerals of reference will designate like elements throughout and specifically referring to the shock absorber depicted in FIGS. 1–7 inclusive, the shock absorber 2 is provided with the usual upper or top end fitting 4 for attachment to an unsprung mass.

The top end fitting 4 is provided with the usual grommet 6 and bushing 3 as is conventional. It will be noted, however, that the end fitting 4, in this case of cast aluminum alloy, has a configuration to receive an adjustment screw 10 which is held within end fitting 4 by means of pin spring 12 and ball detent assembly 14 in conventional manner and as shown in FIG. 4. The function of the adjustment screw 10 which is slotted to receive the edge of a coin or a tool such as a screwdriver will be discussed hereinafter.

The lower portion 16 of end member 4 is configured to receive upper washer cup 18 in swedged or tight fitting relationship which cup member 18 is of sufficient diameter to receive the upper end of main coil spring 20 in the manner illustrated.

Lower portion 16 of upper end fitting 4 is threaded to receive hollow piston rod 22, in this case being of steel and having its upper and lower ends threaded for securement within the assemblage. The lowermost end of piston rod 22 has spaced apertures 23, for reasons which will be described. Wrench flats may be provided on piston rod 22 to aid in assembly. Disposed in close tolerance within piston rod 22 is an axially shiftable adjusting rod 24 having an upper head portion 26 which cooperates with the eccentrically located stub shaft 28 of adjusting member 10 to act in cam and follower arrangment. Thus, as the adjusting member 10 is rotated the rotational movement is translated into vertical movement to lower or raise adjusting rod 24, which because of its narrowed end 30, acts must like a needle metering valve as will become apparent.

An O-ring seal 32 is positioned at the upper end of the adjusting rod 24 to prevent loss of any hydraulic fluid that might be forced along the bore of hollow piston rod 22. For this reason the tolerance between adjusting rod 24 and piston rod 22 are kept as close as possible.

Secured in threaded relationship to the threaded lower end of piston rod 22 is a piston assembly 34 comprising in this instance a steel piston 36 havng an annular configuration with a lower hexagonal portion 38 with the exterior surface being grooved as at 40 to receive a strip of teflon 42 which acts as the piston bearing to prevent scoring or galling of the piston assemblage. Obviously, other gasket or bearing-type of material will also suffice.

The interior bore of the piston 36 is configured so as to receive, in captive relationship therein, a poppet valve member 44, it being cylindrical in shape and held captive within the lower portion of the piston head 36 by means of the coaction of piston rod 22 and the interior bottom wall of piston head 36. The lowermost portion of piston rod 22 is counterbored to receive the steel poppet valve member 44 (best seen in FIG. 4) and is provided with a plurality of spaced apertures 23 approximately 90° around the circumference thereof to allow flow of hydraulic fluid from below the piston assemblage 34 through and above the piston assemblage as will be pointed out hereinafter.

The bottom wall of piston head 36 and more specifically of hexagonal portion 38 is provided with a central aperture 46 with spaced perimetric apertures 48, best seen in FIG. 6. The poppet 44 has a central throughbore which allows for hydraulic fluid flow and the poppet member 44 is normally biased from the bottom wall of piston 36 by means of helical compression spring 50, which it will be noted prevents the bottom edge of poppet 44 from covering perimetric apertures 48. The apertures 46 and 48 in this instance may be about 0.075 inches for the motor bike or motorcycle-type shock aborber under consideration.

The piston rod and piston head assemblage thus far described is adapted to be received within a pressure tube or cylinder 52 of sufficient length to accommodate the travel of the piston assemblage 34 to achieve dampening action. The lower end of pressure tube 52 is configured to form an integral lower end fitting portion 54 having the conventional grommet 56 and bushing 58 whereby the assembled shock absorber 2 may be fastened onto the vehicle. Obviously, the lower end fitting need not be integrally formed with pressure tube 52.

The exterior wall of pressure tube 52 is so configured as to provide spaced longitudinal support spans or sections 60 forming reinforced portions of the cylinder wall with intermediate rib sections 62 having about a 7° incline with respect to the horizontal. Rib or fin sections 62 accommodate lower washer cup 64 which is provided with inwardly directed and upwardly turned flange portions 66 to fit within the channels or grooves 68 formed between adjacent ribs 62, the engagement being obtained in a friction fit or wedging action manner. The lower washer cup 64 is provided with spaced slots 70 for accommodating the longitudinal support spans 60 of pressure tube 52. The lower washer cup 64 therefore may be placed in one of a plurality of the retention grooves 68 formed by the plurality of ribs 62 to thereby provide adjustability for the compression of helical main spring 20 disposed in encircling relationship to at least at portion of pressure tube 52.

The pressure tube 52 defines a fluid chamber which is adaped to hold a fluid such as hydraulic oil or the like once the assemblage has been made substantially fluid tight. To this end the upper portion of pressure tube 52 is adapted to receive nut and bearing assembly 72, having a backup ring 74, O-ring 76, secured to the threaded upper portion of pressure tube 52 as shown in FIG. 4.

The guide member 78 disposed on the outside of pressure tube 52 and held in retained position on the exterior of pressure tube 52 by means of nut and bearing assembly 72 is of deformable material, such as nylon or the like, and acts as a guide for mian compression spring 20 to prevent buckling thereof and to suppress any noise that occurs due to the rubbing action of the spring coils of main spring 20 on the exterior surface of pressure tube 52. The upper lateral flange 80 of guide 78 also provides a gasket to insure fluid tight fitting of nut and bearing assembly 72 with pressue tube 52.

Disposed at the upper end of pressure tube 52 is topout spring 82 which is retained in position by frictional engagement with the lower or bearing portion of nut and bearing assembly 72. Obviously, the top-out spring 82 acts to provide a cushion to the piston assemblage upon extreme rebound conditions. Likewise at the bottom of pressure tube 52 is disposed, in frictionally held relationship, bottoming out spring 84 which acts to buffer or absorb impact forces under high jounce conditions to act against the lower portion of piston 34, the central spring opening receiving hexagonal portion 38.

As has been indicated, the shock absorber as shown in FIG. 4 employs a pressure tube 52 which forms a lower chamber or hydraulic fluid reservoir 85 within which fluid is normally contained and upper chamber 86 above piston assembly 34. Chambers 85 and 86 will be of variable volume depending upon placement of piston assembly 34. The absorber 2 as illustrated in FIG. 4 is shown in the normal or unloaded condition. But upon installation and when the vehicle to which the absorber 2 is attached experiences impact forces, the piston rod 22 with the piston assemblage 34 will move vertically downward to force hydraulic fluid within chamber 85 through orifices 46 and 48, through the bore of poppet 44 and piston 36 and into the bore of piston rod 22 and thence through orifices 23 of piston rod 22 into the interior of chamber 86 of pressure tube 52 located above the piston head 36. The flow of fluid and the action of compression spring 50 maintains poppet 44 in its unseated position. The shock or impact will thus be dampened in the usual fashion and will not be transmitted to the vehicle undismissed.

The above described jounce stroke keeps the perimetric orifices 48 in the open position allowing rapid dampening of the impact forces and upon dissipation thereof the piston assemblage 34 and rod 22 will begin to return towards the position illustrated in FIG. 4. However, it is desirable to prevent rapid return towards this position. Because of the hydraulic fluid pressure in the upper chamber 86 of pressure tube 52, the fluid forces will cause poppet valve 44 to seat upon perimetric orifices 48 to thereby inhibit the reverse flow of hydraulic fluid into lower chamber 85. However, it will be noted that poppet 44 is responsive to the pressure differential of the hydraulic fluid in pressssure tube 52 and moe specifically between chamber 85 and the chamber 86, and will accordingly seat and unseat.

Should high rebound be experienced, the top-out spring 82 will cushion the piston assemblage 34 and will prevent it from contacting nut and bearing assemblage 72. Contrariwise, under high jounce conditions, bottoming out spring 84 will prevent the lower portion of a piston assemblage 34 from contacting the interior bottom wall of pressure tube 52.

It will be noted that the pointed or needle portion 30 of adjusting rod 24 is configured to act much like a needle valve and to allow more or less hydraulic fluid to flow through the flow path between chambers 85 and 86 and vice versa. The adjustment screw or cam 10 may be rotated to the left (as viewed in FIG. 1) to axially shift adjusting rod 24 downwardly into the flow path of the hydraulic fluid to obtain a softer ride and conversely, rotation towards the right will raise the pointed end 30 of adjusting rod 24 to that shown in FIG. 4 to permit relative unrestricted flow of the hydraulic fluid through the flow path between chambers 85 and 86. Thus, the shock absorbing characteristics of the shock absorber 2 may be easily and externally adjusted without disassembling the absorber 2 from the vehicle with which it is associated.

It is obvious that the shock absorber thus far described is easily serviceable and easily rebuilded in the sense that the components are easily disassembled to replace elements which may become worn due to wear. Additionally, not only is adjustment as to shock absorbing character of the absorber 2 obtained by restricting hydraulic fluid flow, it is also obtained by the adjustment of the state of compression of the main spring 20 as earlier described.

Referring now to FIGS. 8 and 9, another embodiment of the shock absorber is illustrated wherein the shock absorber 102 is essentially the same as that disclosed hereinbefore except as will be noted. The most important difference in the shock absorber 102 is in the use of pressure compensator 104 which serves to divide the lower portion of pressure tube 106 and more specifically chamber 108 formed thereby into middle or upper chamber 108 and lower chamber 110 (It should be remembered that an upper chamber is formed above the piston assembly as for the embodiment already described.).

Compensator means 104 is in this instance fabricated of plastic or other conformable material forming a lip seal as at 112 with the interior wall of pressure tube 106. The central portion of compensator 104 is provided with the recess 114 so as to be light weight and to accommodate hydraulic fluid (not shown). The compensator 104 forms substantially liquid tight and fluid tight engagement with the interior wall of pressure tube 106.

Upon fabrication of the absorber 102, an amount of gas will be confined within chamber 110 and in most instances this gas will be air. The hydraulic fluid contained within the chamber 108 will be essentially isolated from this gas or air and thus, in operation of the device 102, aeration and breakdown or oxidation of the hydraulic oil or fluid within chamber 108 will be substantially diminished or eliminated. Upon jounce or rebound conditions the compensatior 104 will fluctuate in a vertical manner along a determined path dictated by the amount of gas in chamber 110 and the amount of liquid in chamber 108. Thus, under jounce conditions the compensator 104 will be forced downwardly as shown in FIG. 9 thereby compressing the gas in chamber 110 but, contrariwise in rebound situations, will be drived in the opposite direction.

It will be noted that in the FIG. 9 embodiment, the bottoming out spring has been removed from the interior of the pressure tube with the spring 116 now being positioned on the upper surface of nut and bearing assembly 118 to act as a bottoming out spring to engage the under surface 120 of upper attachment end 122. Also, in this instance a shaft seal 124 of conventional material is utilized to replace the backup gasket and O-ring shown in the FIG. 4 embodiment. Additionally, the means of retaining adjustment cam screw 126 is slightly different in that a retaining ring 128 is utilized. Otherwise the operation and components illustrated are essentially the same as that heretofore described for the FIG. 1 embodiment.

Referring now to FIG. 10 another embodiment of the shock absorber depicted in FIGS. 8 and 9 is illustrated. In order to give more cushioning effect upon high jounce conditions the lower inside bottom wall 130 of pressure tube 132 is recessed to receive coil spring 134 to act as a cushion for compensator 114. This, then, provides a buffer or shock reducing means should compensator 114 be moved to the extreme downward position as illustrated in FIG. 10.

Referring now to FIG. 11, alternative features of the shock absorber will be described, especially as applied to the FIG. 4 embodiment.

Herein, it will be noted that the ball and detent assembly 14 has been eliminated and in lieu thereof, the cam screw 140 provided which has a 12 point screw head 142 to engage notch 144 provided in the top washer cap 146. The compression of main spring 148 acting upon cam screw 140 keeps it firmly engaged in the notch 144. The central cut out of upper washer cap 146 is modified to accommodate head 142. Rotation of screw 140 causes the engaged point of head 142 to depress washer cap 146 to allow engagement with anyone of the points and consequent repositioning of the shiftable metering rod, as earlier described.

The next modification is that involving the member 151 which in this instance, acts as a wiper and guide not only preventing noise, galling and the like, but providing a shroud or cover to prevent dirt and grime from entering the pressure tube 152, the lower inside surface inside surface 154 of which is recessed to better accommodate bottom-out spring 156. Note that O-ring 158 replaces back-up ring 74 in the previously described embodiment.

The final modification is in the poppet 160 which now carries the biasing spring 162 on its outside diameter, as opposed to being carried within. This prevents undue hindrance of hydraulic fluid flow through poppet 160. Consequently, the outside diameter of poppet 160 is slightly smaller than the poppet 44 and the spring 162 is slightly larger than the spring 50 as previously described.

Thus, there has been described and illustrated at shock absorber for vehicles particularly useful for motorcycles and the like which provides a high degree of versatility with respect to shock absorbing characteristics whether the driver is on improved pavement or traveling over rough surfaces and which shock absorber is easily rebuilt should the need arise.

While specific materials of construction, shapes and configurations have been disclosed, these are not to be taken as delimiting of the invention in that those of ordinary skill in the art will recognize that there are alternatives that will suffice and function as well as the specific components disclosed. Indeed, other modifications and alterations will suggest themselves but all of which will not detract from the spirit and scope of the invention disclosed herein and as defined in the appended claims.

We claim:

1. In a hydraulic shock absorber the combination of: a pressure tube having a reciprocable piston assembly therein, said assembly including a hollow piston rod having a piston on one end thereof, said piston having a central, axial, primary fluid passageway communicating one portion of said pressure tube with the other through said hollow piston rod and said piston, attachment means on the other end of said hollow piston rod for attachement of said shock absorber to an unsprung mass, said attachement means having an axial bore with a transverse bore communicating to the exterior thereof; an elongate adjustable metering rod shiftably mounted in said hollow piston rod and axial bore of said attachment means and movable into and out of restricting hydraulic fluid position with respect to said central, axial, primary fluid passageway, said metering rod having a length at least as long as said hollow piston rod and having one extremity within said attachment means having a recessed portion and the other extremity having a reduced portion; and externally accessible adjusting means disposed in said transverse bore of said attachment means in operative engagement with said recessed portion of said metering rod to adjust the position of said metering rod to any desired position within the stroke limits of said metering rod for movement of the reduced portion of said metering rod into said central, axial, primary fluid passageway and means located in said transverse bore for locking said adjustment means and therefore said metering rod in each adjusted position.

2. The shock absorber in accordance with claim 1 wherein the end of said metering rod proximate said at least one fluid passageway is of smaller diameter than the remainder of said rod.

3. The shock absorber in accordance with claim 2 wherein said end of said metering rod proximate said at least one fluid passageway is pointed.

4. The shock absorber in accordance with claim 3 wherein said adusting means comprises an eccentric cam cooperating with the recessed portion of said metering rod to axially shift same.

5. The shock absorber in accordance with claim 4 wherein said recessed portion of said metering rod is a peripheral groove which is engaged by an eccentric stub shaft of an adjusting screw accessible from the exterior of said shock absorber.

6. The shock absorber in accordance with claim 1 which includes a spring member in said one portion of said pressure tube to engage said piston upon high rebound conditions.

7. The shock absorber in accordance with claim 6 which includes a spring member in said other portion of said pressure tube to engage said piston upon high jounce conditions.

8. The shock absorber in accordance with claim 7 which includes a main spring retainingly carried in encircling engagement of at least said piston assembly.

9. The shock absorber in accordance with claim 8 wherein said main spring is retained by retaining members, at least one of which is adjustable to carry said main spring under various selected states of compression.

* * * * *